(12) United States Patent
Kancharla et al.

(10) Patent No.: US 10,286,487 B2
(45) Date of Patent: May 14, 2019

(54) LASER SYSTEM AND METHOD FOR PROCESSING SAPPHIRE

(71) Applicant: IPG Photonics Corporation, Oxford, MA (US)

(72) Inventors: Vijay Kancharla, Shrewsbury, MA (US); William Shiner, Millbury, MA (US); Steven Maynard, Dudley, MA (US); Jeffrey P. Sercel, Hollis, NH (US); Marco Mendes, Manchester, NH (US); Rouzbeh Sarrafi, Fremont, NH (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 843 days.

(21) Appl. No.: 14/770,565

(22) PCT Filed: Feb. 28, 2014

(86) PCT No.: PCT/US2014/019460
§ 371 (c)(1),
(2) Date: Aug. 26, 2015

(87) PCT Pub. No.: WO2014/134470
PCT Pub. Date: Sep. 4, 2014

(65) Prior Publication Data
US 2016/0001398 A1    Jan. 7, 2016

Related U.S. Application Data

(60) Provisional application No. 61/770,816, filed on Feb. 28, 2013.

(51) Int. Cl.
B23K 26/06    (2014.01)
B23K 26/14    (2014.01)
(Continued)

(52) U.S. Cl.
CPC ...... *B23K 26/0665* (2013.01); *B23K 26/0622* (2015.10); *B23K 26/0648* (2013.01);
(Continued)

(58) Field of Classification Search
CPC ............ B23K 26/0622; B23K 26/0648; B23K 26/0665; B23K 26/082; B23K 26/14;
(Continued)

(56) References Cited

U.S. PATENT DOCUMENTS

| 3,860,784 A | 1/1975 | Brown et al. |
|---|---|---|
| 4,248,369 A | 2/1981 | Clausen |

(Continued)

FOREIGN PATENT DOCUMENTS

| CN | 103949779 A | 7/2014 |
|---|---|---|
| JP | S56169347 A | 12/1981 |

(Continued)

OTHER PUBLICATIONS

U.S. Notice of Allowance dated May 19, 2017, received in related U.S. Appl. No. 14/838,809, 6 pgs.

(Continued)

*Primary Examiner* — Geoffrey S Evans
(74) *Attorney, Agent, or Firm* — Grossman, Tucker, Perreault & Pfleger, PLLC (57) ABSTRACT

Laser processing of sapphire is performed using a continuous wave laser operating in a quasi-continuous wave (QCW) mode to emit consecutive laser light pulses in a wavelength range of about 1060 nm to 1070 nm (hereinafter "QCW laser"). Laser processing of sapphire using a QCW laser may be performed with a lower duty cycle (e.g., between about 1% and 10%) and in an inert gas atmosphere such as argon or helium. Laser processing of sapphire using a QCW laser may further include the use of an assist laser having a shorter wavelength and/or pulse duration to modify a property of the (Continued)

sapphire substrate to form absorption centers, which facilitate coupling of the laser light pulses of the QCW laser into the sapphire.

19 Claims, 3 Drawing Sheets

(51) Int. Cl.
*B23K 26/38* (2014.01)
*B23K 26/382* (2014.01)
*B23K 26/402* (2014.01)
*B23K 26/082* (2014.01)
*B23K 26/364* (2014.01)
*B23K 26/0622* (2014.01)
*B23K 103/00* (2006.01)

(52) U.S. Cl.
CPC ............ *B23K 26/082* (2015.10); *B23K 26/14* (2013.01); *B23K 26/364* (2015.10); *B23K 26/38* (2013.01); *B23K 26/382* (2015.10); *B23K 26/402* (2013.01); *B23K 2103/50* (2018.08)

(58) Field of Classification Search
CPC .... B23K 26/364; B23K 26/38; B23K 26/382; B23K 26/402
See application file for complete search history.

(56) References Cited

U.S. PATENT DOCUMENTS

| | | | |
|---|---|---|---|
| 4,338,114 | A | 7/1982 | Brockway et al. |
| 5,697,998 | A | 12/1997 | Platus et al. |
| 5,916,460 | A | 6/1999 | Imoto et al. |
| 6,376,797 | B1 | 4/2002 | Piwczyk et al. |
| 6,705,125 | B2 | 3/2004 | Peterson et al. |
| 6,841,482 | B2 | 1/2005 | Boyle |
| 7,425,471 | B2 | 9/2008 | Bruland et al. |
| 7,592,563 | B2 | 9/2009 | Wissenbach et al. |
| 7,994,450 | B2 | 8/2011 | Haight et al. |
| 8,116,341 | B2 | 2/2012 | Lei et al. |
| 8,652,658 | B2 | 2/2014 | Tatartchenko et al. |
| 2001/0009250 | A1 | 7/2001 | Herman et al. |
| 2001/0020548 | A1 | 9/2001 | Burgess |
| 2001/0035401 | A1 | 11/2001 | Manor |
| 2002/0056891 | A1 | 5/2002 | Wu |
| 2005/0279740 | A1 | 12/2005 | Liu et al. |
| 2006/0114948 | A1 | 6/2006 | Lo et al. |
| 2007/0062917 | A1 | 3/2007 | Fu et al. |
| 2007/0104243 | A1 | 5/2007 | Chen |
| 2007/0228100 | A1* | 10/2007 | Gonoe ............... B23K 26/0736 225/1 |
| 2007/0272668 | A1* | 11/2007 | Albelo ................ B23K 26/386 219/121.72 |
| 2010/0177794 | A1 | 7/2010 | Peng et al. |
| 2011/0085574 | A1* | 4/2011 | Osako ................ B23K 26/0622 372/25 |
| 2011/0132885 | A1 | 6/2011 | Sercel et al. |
| 2011/0139759 | A1 | 6/2011 | Millman, Jr. et al. |
| 2011/0170172 | A1* | 7/2011 | Mizushima ............. G02F 1/353 359/326 |
| 2012/0061356 | A1* | 3/2012 | Fukumitsu ......... B23K 26/0057 219/121.61 |
| 2012/0255935 | A1* | 10/2012 | Kakui ................ B23K 26/0063 219/121.6 |
| 2013/0126573 | A1 | 5/2013 | Hosseini et al. |
| 2013/0134139 | A1 | 5/2013 | Duerr et al. |
| 2013/0153554 | A1* | 6/2013 | Duerr ................ B23K 26/0676 219/121.69 |
| 2013/0215914 | A1 | 8/2013 | Imai et al. |
| 2014/0030443 | A1 | 1/2014 | Prest et al. |
| 2014/0076299 | A1 | 3/2014 | Richter et al. |

FOREIGN PATENT DOCUMENTS

| | | |
|---|---|---|
| WO | 2010123068 A1 | 10/2010 |
| WO | 2014012125 A1 | 1/2014 |

OTHER PUBLICATIONS

U.S. Office Action dated Oct. 4, 2017, received in related U.S. Appl. No. 14/838,837, 22 pgs.
Taiwanese Office Action with English language summary, dated Nov. 16, 2017, received in TW Application No. 103106983, 11 pgs.
U.S. Office Action dated Feb. 8, 2017, received in related U.S. Appl. No. 14/838,809, 10 pgs.
PCT International Search Report and Written Opinion dated Nov. 24, 2015, received in corresponding PCT Application No. PCT/US15/047456, 11 pgs.
PCT International Search Report and Written Opinion dated Jun. 10, 2014, received in related PCT Application No. PCT/US14/19460, 13 pgs.
QCW Fiber Laser 2012 Series, Datasheet [online], IPG, Jan. 2012, https://web.archive.org/web/20120314232840/http://www.ipgphontonics.com/Collateral/Documents/English-US/QuasiCW_SM_IPG.pdf., 2 pgs.
PCT International Search Report and Written Opinion dated Jun. 8, 2015, received in related PCT Application No. PCT/US15/18038, 12 pgs.
PCT International Search Report and Written Opinion dated Nov. 27, 2015, received in related PCT Application No. PCT/US15/47485, 11 pgs.
European Examination Report, dated May 4, 2018, in related Application No. 14 757 006.3, 6 pp.

* cited by examiner

LASER SYSTEM AND METHOD FOR PROCESSING SAPPHIRE

CROSS-REFERENCE TO RELATED APPLICATIONS

The present application claims the benefit of U.S. Provisional Patent Application Ser. No. 61/770,816 filed Feb. 28, 2013, which is fully incorporated herein by reference. The present application is also related to U.S. Provisional Patent Application Ser. No. 61/945,911 filed Feb. 28, 2014 entitled MULTIPLE-BEAM LASER PROCESSING USING MULTIPLE LASER BEAMS WITH DISTINCT WAVELENGTHS AND/OR PULSE DURATIONS, which is filed concurrently herewith and fully incorporated herein by reference.

BACKGROUND OF THE DISCLOSURE

Field of the Disclosure

The present disclosure relates to processing sapphire using lasers in a wavelength range of about 1060-1070 nm, and more particularly, relates to laser processing sapphire with a modulated single mode ("SM") fiber laser system operating in a quasi-continuous wave mode ("QCW").

Background Art Discussion

Hard materials such as sapphire ($Al_2O_3$) are used for many industrial applications such as optical windows, hard materials preventing abrasion, and buffer materials for semiconductor emitting device, and the like. Conventional mechanical methods for treating or processing sapphire substrates include diamond scribing and blade dicing. When using these methods, the low depth of the scribe can lead to breaking the substrate, which lowers production yields, for example, when manufacturing of LEDs. Other problems associated with blade dicing include formation of debris (which may require post-cutting cleaning), stress induced into the substrate, and the relatively large width of the cut known as kerf.

Laser processing methods have been used in an effort to increase efficiency because they provide a noncontact process that is more efficient for high volume production. The laser scribed cutting depth may also be controlled to reduce stress on the wafer during the break process. Also, laser scribing facilitates precise positioning of scribes within a few microns of active features along with a narrow scribe width with fewer chippings. Thus, laser processing has overall advantages of increased throughput, low cost, ease of use, and high yields compared to traditional mechanical methods.

Certain materials, however, present challenges when processing using lasers. The bandgap of sapphire, for example, is approximately 8 eV, and under normal low intensity illumination, sapphire is optically transparent from 5000 nm to about 300 nm. Therefore, conventional laser processing of sapphire has used lasers that are more likely to be absorbed in sapphire, such as DUV and UV lasers operating in a wavelength range between about 157 and about 355 nm.

One technique for laser processing of sapphire involves ablation, which is a vaporization of the material resulting from a combination of bulk heating of the material and avalanche ionization. Ultrafast lasers (e.g., picosecond and shorter pulse widths) and/or Q-switched pulse lasers with nanosecond pulse widths may be used to emit pulses with high peak power capable of ablating sapphire. The high intensity drives a nonlinear, multiphoton absorption process which excites electrons in the material and directly breaks bonds. However, high peak power may thermally damage the cut edge because the heat from the absorption of the laser beam has time to diffuse into the substrate.

Another laser processing technique involves scribing and breaking along internal modification regions inside the sapphire. The output of a picoseconds laser, for example, may be focused inside the sapphire substrate creating cracks within the substrate without affecting the top and bottom surfaces. Once these cracks are produced, the individual pieces may be broken out from the substrate using mechanical means such as tape expansion. This two-step process, however, may be time consuming and cost inefficient.

A further technique for laser processing materials with a low absorption coefficient includes water jet laser processing. Water jet laser processing involves focusing a laser beam into a hair-thin, low-pressure water jet, which then guides the laser beam onto the wafer. Water jet laser processing systems, such as the Laser-Microjet® system, may prevent heat damage and contamination but also involves a more complex and expensive system. A Q-switched Nd:YAG laser operating at 1064 nm and frequency-doubled Nd:YAG lasers operating at 532 nm are particularly adapted to the water jet-guided cutting technology.

The existing techniques used for laser processing of sapphire discussed above suffer from some of the same drawbacks. In particular, the cost of pulsed lasers is high. Also, the wavelengths used in UV cutting require the use of crystals, which may have a short useful life and may present issues with the maintenance of these lasers. Although excimer lasers may be used, these lasers generally have large dimensions and low efficiency.

Accordingly, a need exists for a system and method of laser cutting sapphire substrates at wavelengths of around 1060-1070 nm with reduced cutting edge defects and increased speeds in a time-effective and a cost-effective manner.

SUMMARY OF THE DISCLOSURE

Consistent with an embodiment, method is provided for laser processing a sapphire substrate. The method includes: periodically switching on a power source to pulse a continuous wave laser, thereby operating the laser in a quasi-continuous wave ("QCW") mode so as to emit consecutive pulses of laser light at a wavelength ranging between about 1060 nm and about 1070 nm; focusing the pulses of laser light at the sapphire substrate; and laser processing the sapphire substrate with the pulses of laser light.

Consistent with another embodiment, laser processing system is provided for laser processing sapphire substrates. The laser processing system includes a fiber laser configured to operate in a quasi continuous wave ("QCW") mode to emit consecutive pulses of laser light at a wavelength between about 1060 nm and about 1070 nm and a controller coupled to the fiber laser for periodically switching power to the SM fiber laser to pulse the fiber laser in the QCW mode with a duty cycle ranging between about 1% and about 10%. The laser processing system also includes a focus lens configured to focus the laser light on the sapphire substrate so as to process the sapphire substrate, a laser head configured to direct the focused laser light to the sapphire substrate and including a nozzle for delivering an inert gas to the sapphire substrate with the laser light, and a gas delivery system configured to deliver the inert gas into the laser head.

Consistent with a further embodiment, a multiple-beam laser processing system is provided for processing a sapphire substrate. The multiple-beam laser processing system includes: an assist laser for generating an assist laser beam with a wavelength and a pulse duration such that the sapphire substrate is sufficiently absorptive of the assist laser beam to modify a property of the sapphire substrate; a quasi continuous wave (QCW) fiber laser for generating a process laser beam with a wavelength between about 1060 nm and about 1070 nm, wherein the wavelength of the assist laser beam is less than the wavelength of the process laser beam; and a beam combiner for directing the assist laser beam and the process laser beam at a target location on the workpiece such that the assist laser beam modifies a property of the sapphire substrate at the target location forming absorption centers and such that the process laser beam is coupled into the absorption centers formed in the sapphire substrate at the target location to complete processing of the sapphire substrate at the target location.

BRIEF DESCRIPTION OF THE DRAWINGS

These and other features and advantages will be better understood by reading the following detailed description, taken together with the drawings wherein.

DETAILED DESCRIPTION

Laser processing of sapphire, consistent with embodiments of the present disclosure, is performed using a continuous wave laser operating in a quasi-continuous wave (QCW) mode to emit consecutive laser light pulses in a wavelength range of about 1060 nm to 1070 nm (hereinafter "QCW laser"). Laser processing of sapphire using a QCW laser may be performed with a lower duty cycle (e.g., between about 1% and 10%) and in an inert gas atmosphere such as argon or helium. Laser processing of sapphire using a QCW laser may further include the use of an assist laser having a shorter wavelength and/or pulse duration to modify a property of the sapphire to form absorption centers, which facilitate coupling of the laser light pulses of the QCW laser into the sapphire.

Laser processing using the QCW laser, consistent with embodiments described herein, may include drilling, cutting and/or scribing the sapphire substrate. Sapphire is a crystalline form of alumina ($Al_2O_3$), which is transparent to light wavelengths between about 170 nm and 5300 nm, five (5) times stronger than glass, and nine (9) on the Mohs scale of hardness. Sapphire is also a good electrical insulator and has a high thermal conductivity. Sapphire may be particularly advantageous in manufacturing of blue and green light emitting diodes ("LED"). Sapphire also has potential for replacing the existing glass covering the screen for a mobile device including, but not limited to, telephones, cameras, computers and the like. Thus, the laser processing systems and methods described herein may be used to cut sapphire substrates to a desired shape for use in manufacturing photonic devices, screens and other products incorporating sapphire.

As used herein, "absorption center" refers to a location in a non-absorptive material where the properties of the material have been modified (e.g., craters, roughening, optical damage, internal material defects, color centers, bulk material property changes, or increased temperature) such that light is more likely to be absorbed as compared to an unmodified region of the material. As used herein, "wavelength" refers to an approximate emission wavelength of a laser and may encompass a band or range of wavelengths around the stated wavelength. As used herein, "ultraviolet (UV) spectral range" refers to a spectral range of 10 nm to 380 nm, "visible spectral range" refers to a spectral range of 380 nm to 700 nm, and "infra-red spectral range" refers to a spectral range of 700 nm to 10.6 μm.

Figure 1:
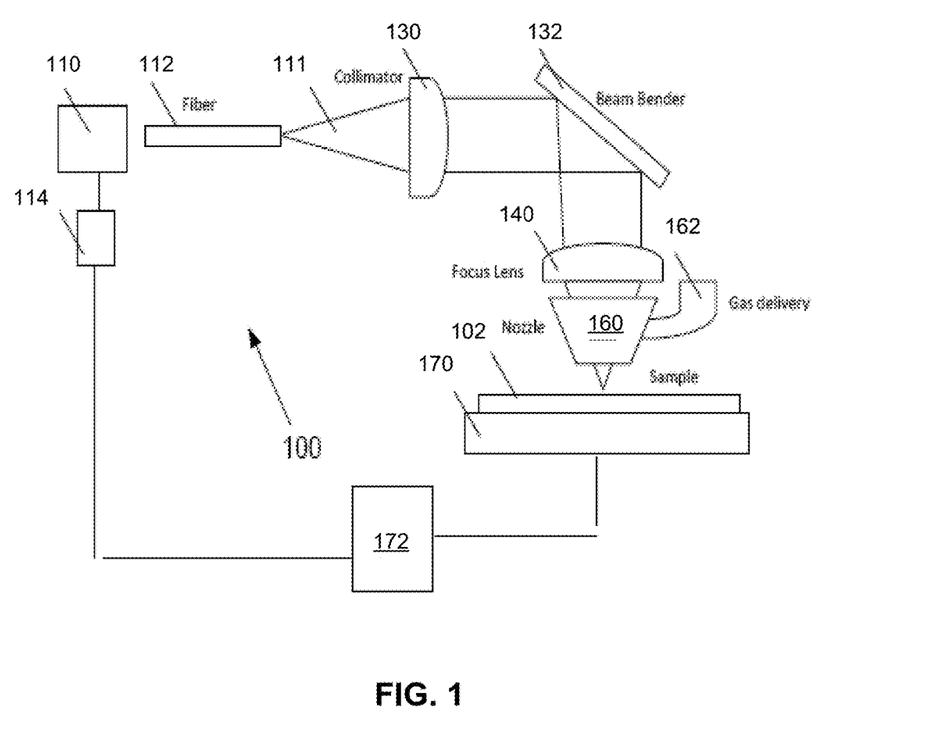
FIG. 1 is a schematic diagram of a laser processing system for cutting a sapphire material using a quasi-continuous wave (QCW) laser system, consistent with an embodiment of the present disclosure.

Referring to FIG. 1, an embodiment of a laser processing system 100 is described for processing a workpiece 102, such as a sapphire substrate, using a focused laser beam. The workpiece 102 may also be made from other large bandgap and/or transparent materials including, without limitation, aluminum diamond, gallium nitride, silicon carbide, zinc selenide, silicon, silicon nitride, aluminum nitride, gallium nitride on sapphire, and glass (e.g., fused quartz or silica). Although the example embodiments described herein mostly relate to laser treatment or processing of sapphire, at least some of these other large bandgap materials can be successfully treated with the disclosed laser processing systems.

In the illustrated embodiment, the laser processing system 100 includes a QCW single mode (SM) fiber laser 110 emitting a single mode, divergence limited laser beam 111 from the downstream end of a processing passive fiber 112. The QCW fiber laser 110 may range in power from 500 W to 50 kW and may have a monolithic, entirely solid state, fiber-to-fiber design that does not require mirrors or optics to align or adjust. The QCW fiber laser 10 may also be modular, built from multiple laser units, each one generating hundreds of watts of output power. This also allows the laser system to incorporate reserve modules and power margins. The QCW SM fiber laser may include, for example, a QCW SM ytterbium fiber laser with an emission wavelength of about 1070 nm, such as the QCW series available from IPG Photonics Corporation. In other embodiments, the laser may include a fiber disc laser or a rod laser such as a Nd:YAG laser. Multi-mode lasers may also be used.

The laser processing system 100 also includes a collimator 130 to collimate the beam 111 and a beam bender or reflector 132 to direct the beam 111 to a focus lens 140. The focus lens 140 may focus the beam 111 to a relatively small spot size, for example, in a range of about 14-30 μm. Alternatively or additionally, other optics may also be used for modifying and/or directing the laser light to the desired location. Such optics may include, without limitation, beam expanders, beam collimators, beam shaping lenses, reflectors, masks, beamsplitters and scanners (e.g., a galvanometer).

The laser processing system 100 further includes a laser head including a nozzle 160 coupled to a gas delivery system 162. The gas delivery system 162 may provide a stream of inert gas, such as nitrogen, argon or helium, to the nozzle 160 close to the work area when processing the workpiece 102. The gas may be delivered with a pressure in a range of about 100 to 300 psi. The presence of the inert atmosphere improves the efficiency of the laser processing.

The laser processing system 100 further includes a translation stage 170 configured to impart a translational motion to the workpiece 102 in one or more axes or dimensions, thereby allowing the workpiece 102 to move relative to the focused laser beam. The translation stage 170 may be operated manually or may receive commands from a controller 172. Alternatively, the laser 110 may be moved and displaced relative to the workpiece 102 to be processed. The controller 172 includes processing circuitry, such as a central processing unit ("CPU"), to communicate with translation stage 170.

The QWC SM fiber laser 110 includes a pump source 114 operable to be switched on for time intervals having a duration long enough to operate the laser as close to its steady state as possible, i.e. the laser is optically in the state of continuous-wave operation, also referred to as a quasi-continuous wave (QCW) mode. The controller 172 may be used to control the pump source 114. The percentage of time the laser is switched on, i.e., the duty cycle, is selected to reduce the heating and heat related problems. The controller 172 may control the pump source 114, for example, to have a duty cycle in a range of about 1% to 10%. Therefore, the QCW SM fiber laser 110 operating in the QCW mode may have higher output peak powers and lower average powers.

In one example, a sapphire substrate with a thickness of 0.7 mm was processed using the following process and laser parameters: a Ytterbium (Yb) single mode laser; 1070 nm wavelength; 14 μm fiber core diameter; 60 mm collimating distance; 123 mm focal length; 28.7 μm spot size; 900 W peak power; 87.5 μs pulse duration; 400 Hz pulse frequency; 78.7 mJ pulse energy; argon or nitrogen assist gas at 250 psi; 0.5 mm nozzle stand off; 1.5 mm nozzle orifice; and 8.46 mm/s cutting speed.

Figure 2A:
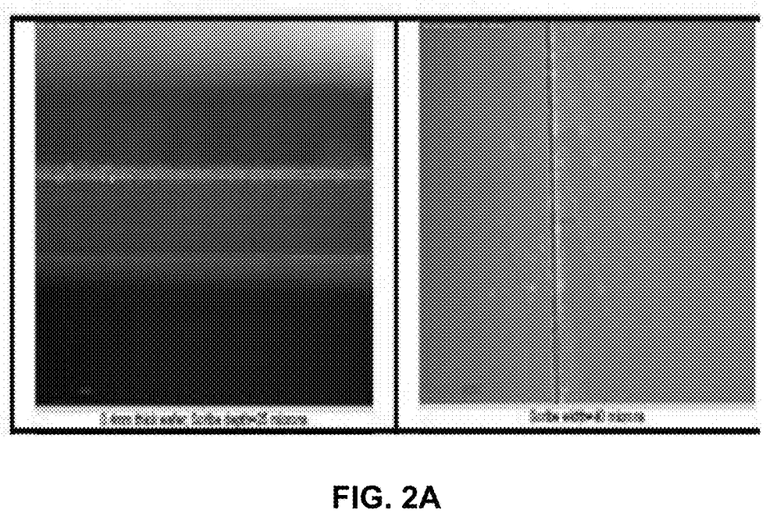
FIGS. 2A and 2B are images illustrating a sapphire substrate with a scribe line formed using a QCW laser system, consistent with an embodiment of the present disclosure.
Figure 2B:
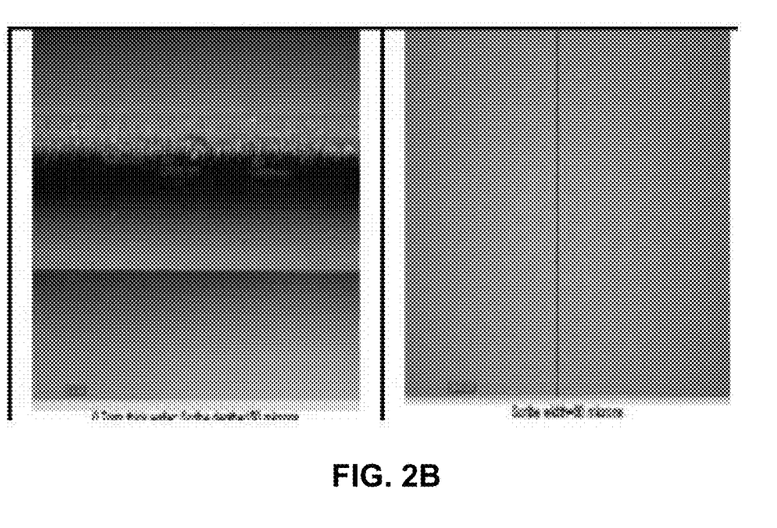

FIGS. 2A and 2B illustrates the results obtained using the laser processing system 100 of FIG. 1 for processing or treating the sapphire substrate with the parameters indicated above. As shown, the edges are clean and there are no visible cracks. Equally satisfactory results were obtained for unpolished and polished samples.

In another example, sample sapphire substrates of different thicknesses (e.g., 0.015 in. and 0.040 in.) were processed with different processing operations (e.g., scribing, cutting, and drilling) using a Yb-doped QCW SM fiber laser at different duty cycles, pulse frequencies and speeds. The following Table I illustrates the parameters used for these processing operations.

the thickness of the sample at a speed of about 420 ipm. Cutting the 0.015"-thick sapphire sample was also effective at a 285 W power and speed of about 40 ipm. Drilling circular holes in the sapphire samples was successful at relatively low speeds. The same processing operations were also successfully performed on the 0.040" thick wafer.

These examples illustrate that sapphire substrates can be efficiently processed by a QCW SM fiber laser at a wavelength in the range of about 1060-1070 nm. The single mode beam with a relatively small spot provides a high power density capable of breaking down the material. Better processing appears to be possible at lower duty cycles, i.e., low average powers. The peak power and average power may need to be higher as the material thickness increases, but the low duty cycle appears to be more of a key factor than peak power.

In a further example, a high-quality cut may be achieved at 900 W, 500 Hz and 3% duty cycle (i.e., average power of 27 W) with a speed of 20 inches/min. In this example, the cutting speed may be doubled to 40 inch/min by increasing the pulse frequency to 1000 Hz. The quality of the cut may deteriorate in response to scaling up the laser power. Also, the quality may improve at shorter pulse widths (e.g., 50-100 microseconds) which may lead to a high-speed process. The longer pulses also provide high quality cuts, but increasing the duty cycle results in longer periods of time to complete the processing.

In yet another example, sapphire substrates with a thickness between about 0.4 mm and 0.7 mm were processed using the following process and laser parameters: a Ytterbium (Yb) single mode laser; 1070 nm wavelength; 14 μm fiber core diameter; 60 mm collimating distance; 123 mm focal length; 28.7 μm spot size; argon or nitrogen assist gas at 250 psi; and 1.5 mm nozzle orifice. The following Table II shows the results of processing using the above param-

TABLE I

| Sapphire thickness (inches) | Process | Power (W) | Frequency (Hz) | Duty Cycle (%) | Speed (inches per minute ("ipm")) | Assist gas |
| --- | --- | --- | --- | --- | --- | --- |
| 0.015" | Scribing | 285 | 3500 | 20 | 420 | 30 psi $N_2$ |
| 0.015" | Cutting | 285 | 2000 | 40 | 40 | 30 psi $N_2$ |
| 0.015" | Drilling | 285 | 2000 | 40 | <10 | 30 psi $N_2$ |
| 0.040" | Scribing | 285 | 2500 | 25 | 360 | 30 psi $N_2$ |
| 0.040" | Scribing | 285 | 500 | 30 | 30 | 30 psi $N_2$ |
| 0.040" | Drilling | 285 | 2000 | 30 | <10 | 30 psi $N_2$ |

In this example, scribing of the 0.015"-thick sapphire sample with a laser beam at 285 W removed about 30% of eters with different peak power, frequency, duty cycle, pulse width and cut speed.

TABLE II

| # | Material | Peak Power (W) | Frequency (Hz) | Duty Cycle (%) | Pulse Width (ms) | Cut Speed (Inch/min) | Comments |
| --- | --- | --- | --- | --- | --- | --- | --- |
| 1 | 0.4 mm polished | 400 | 160 | 2.75 | 0.171 | 12 | Very fine powdery dross. The dross rubs off easily just by wiping it. Some chipping and cracks. Less than <30 microns at random places. |

TABLE II-continued

| # | Material | Peak Power (W) | Frequency (Hz) | Duty Cycle (%) | Pulse Width (ms) | Cut Speed (Inch/min) | Comments |
|---|---|---|---|---|---|---|---|
| 2 | 0.7 mm unpolished | 900 | 400 | 3.5 | 0.0875 | 16-20 | Very fine powdery dross. The dross rubs off easily just by wiping it. No cracking but some chipping. Less than <40 microns at random places. |
| 3 | 0.7 mm unpolished | 750 | 300 | 3.5 | 0.116 | 12 | Very fine powdery dross. The dross rubs off easily just by wiping it. No cracking but some chipping. Less than <40 microns at random places. Optics used is 200 Focal/120 mm collimator. |

Based on the foregoing, a QCW SM laser with a wavelength in a range of 1060-1070 nm can be successfully used for cutting a sapphire substrate with minimal cracks and chipping. In the above example, the 0.7 mm thick substrate has better cut quality. The 0.4 mm thick substrate exhibits chips along the edge of the cuts; however, the chips are generally less than 40 microns, which is considered to be a high quality cut as known to one of ordinary skill. The laser processing method disclosed herein also appears to be sensitive to high frequencies with significant chipping occurring at higher frequencies. The quality of the cuts also depends on the duration of duty cycle with a lower the duty cycle improving the cut quality. Peak power above 1600 W with a duty cycle of up to 10% may not provide any visible advantages, but a duty cycle lower than 1% may deteriorate the quality of cuts. A gas pressure range between 200 and 300 psi also improved the efficiency of the process in these examples. The beam spot size is generally between about 14 and 30 microns, and using a spot size lower than 14 micron generally does not substantially affect the quality and efficiency of the process.

In a further example, sapphire substrates with a thickness of 2.7 mm were successfully cut using a multimode QCW laser with a 50 micron fiber with the following parameters: 15 kW peak power; 450 W average power; 0.6 ms pulse width; 100 micron spot size; 50 Hz repetition rate; 3% duty cycle; 10 ipm speed; argon gas at 100 psi; a 1.5 mm nozzle diameter; and a 1 mm standoff. The use of argon or helium as the assist gas was found to improve cutting efficiency, possibly because of the trace Ti found in sapphire.

Figure 3:
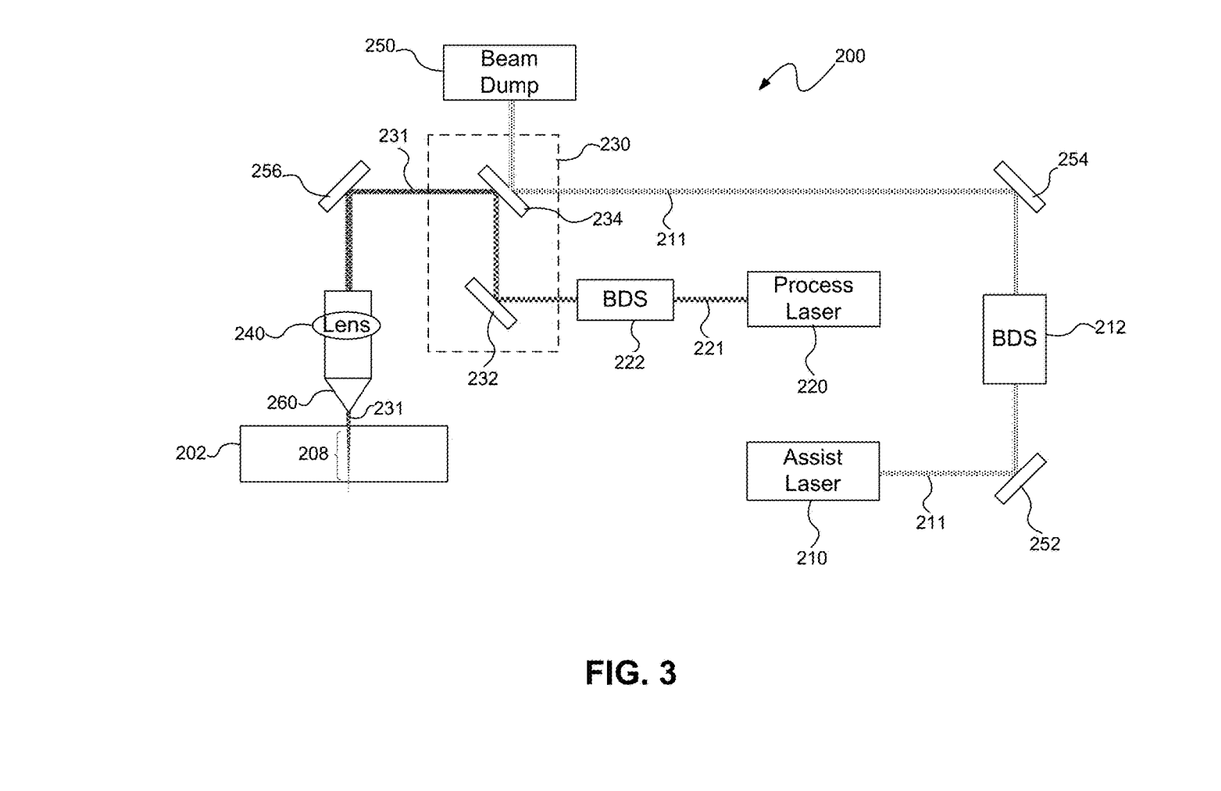
FIG. 3 is a schematic diagram of a multiple-beam laser processing system, consistent with another embodiment of the present disclosure.

Referring to FIG. 3, a multiple-beam laser processing system 200 may also be used to process sapphire. Multiple-beam laser processing may be performed on a sapphire substrate or workpiece 202 using both an assist laser beam 211 and a process laser beam 221 with different characteristics (e.g., wavelengths and/or pulse durations). The assist laser beam 211 is directed at a target location 208 on or within the workpiece 202 to modify a property of the sapphire (e.g., induce damage or increase temperature) such that absorption centers are formed in the sapphire. The process laser beam 221 is directed at the target location 208 and is coupled into the absorption centers formed in the sapphire to complete processing of the sapphire. The assist laser beam 211 and the process laser beam 221 individually are not capable of completely processing the sapphire workpiece but together (either simultaneously or sequentially) provide a synergy that enables processing.

The illustrated embodiment of the multiple-beam laser processing system 200 includes an assist laser 210 for generating the assist laser beam 211 (e.g., a green laser of about 532 nm) and a process laser 220 for generating the process laser beam 221 (e.g., a QCW SM fiber laser of about 1060 to 1070 nm). The assist and process lasers 210, 220 are optically coupled to respective beam delivery systems 212, 222 for modifying the assist and process laser beams 211, 221, respectively, before combining the beams. The multiple-beam laser processing system 200 further includes a beam combiner 230, a focus lens 240, a laser processing head 260, and one or more reflectors or mirrors 252, 254, 256 for directing the assist and process laser beams 211, 221 as a combined laser beam 231 to the same target location 208 on or within a workpiece 202.

Although the illustrated embodiment shows the assist and process laser beams 211, 221 being combined simultaneously, the beams 211, 221 may also be combined such that the beams are directed to the same target location 208 at different times. Directing the laser beams 211, 221 simultaneously may include any amount of overlap between the bursts or pulses of the laser beams 211, 221 and does not necessarily require the laser beams to have the same burst or pulse duration. The assist laser beam 211 may start before or during the process laser beam 221. The laser beams 211, 221 may also be directed to the workpiece 202 at different times, for example, with the assist laser beam 211 before the process laser beam 221.

In the illustrated embodiment, the assist laser 210 may be a rare-earth-doped fiber laser such as a GLP Series pulsed green fiber laser available from IPG Photonics Corporation. In other embodiments, the assist laser 210 may include diode pumped solid state (DPSS) lasers, excimer lasers, gas lasers, and other types of lasers known to those skilled in the art. The process laser 220 may also be a rare-earth-doped fiber laser such as a QCW Series single-mode ytterbium fiber laser available from IPG Photonics Corporation.

The assist laser beam delivery system 212 may include a variable telescope to provide beam expansion and divergence control of the assist laser beam 211. In particular, the divergence of the assist laser beam 211 may be controlled to have an optimized numerical aperture (NA) to create substantially the same focal plane as the process laser beam 221 after the laser beams 211, 221 are combined. The process laser beam delivery system 222 may include a collimator such as, for example, a collimating lens with a focal length of 100 mm. Alternatively or additionally, the beam delivery systems 212, 222 may also include other optics for modifying and/or directing the laser light to the desired location. Such optics may include, without limitation, beam expanders, beam collimators, beam shaping lenses, reflectors, masks, beamsplitters and scanners (e.g., a galvanometer).

In the illustrated embodiment, the beam combiner 230 includes reflectors or mirrors 232, 234 for selectively reflecting the wavelengths of the assist and process laser beams 211, 221, respectively, such that the beams 211, 221 are directed along the same optical axis. The first mirror 232 is coated to reflect the wavelength of the process laser beam 221, and the second mirror 234 is coated on one side to reflect the wavelength of the process laser beam 221 and uncoated on the other side to allow at least a portion of the assist laser beam 211 to pass through. Thus, the second mirror 234 combines both beams 211, 221. In an embodiment with a green assist laser beam 211 and an IR process laser beam 221, for example, the first mirror 232 may be IR coated and the second mirror 234 may be IR coated on one side and uncoated on the other side. The uncoated side of the second mirror 234 may still reflect a portion of the assist laser beam 211 to a beam dump 250. Other embodiments for the beam combiner 230 are also within the scope of the present disclosure.

The mirrors 252, 254, 256 may be coated to reflect the desired wavelengths of the laser beams 211, 221. In an embodiment with a green assist laser beam 211 and an IR process laser beam 221, for example, the mirrors 252, 254 reflecting the green laser beam may be 532 nm or green coated mirrors capable of reflecting the green assist laser beam 211 and the mirror 256 may be a dual IR-green coated mirror capable of reflecting both the green assist laser beam 211 and the IR process laser beam 221. In one embodiment, the transmission of the multiple-beam laser processing system 200 may be 40% for the assist laser beam 211 and 90% for the process laser beam 221.

Although the illustrated embodiment shows free space delivery using mirrors, other optical components may also be used to deliver and/or combine the lasers. For example, one or more fibers may be used to deliver the laser beams to the laser processing head 260. In this embodiment, the lasers may be combined by focusing the lasers to the same location 208 on or within the workpiece 202.

The focus lens 240 may be a singlet focusing lens such as, for example, a lens with an 88 mm focal length and coated for IR. The focus lens 240 may be capable of focusing the laser beams to a beam spot with a diameter or dimension in a range of about 30 to 40 μm. In other embodiments, the beam delivery systems and focus lens 24 may be capable of focusing the lasers 211, 221 to an even smaller beam spot, for example, as small as 15 μm or smaller.

In the illustrated embodiment, the laser processing head 260 includes a gas assist nozzle 262 to direct a pressurized gaseous medium to the workpiece 202 together with the laser beams to facilitate laser processing, for example, when using a thermal cutting process where the gas helps to expel molten material. The gaseous medium may include, for example, oxygen ($O_2$). In other embodiments, the gaseous medium may be an inert gas, such as nitrogen, argon or helium.

Although the illustrated embodiments show multiple lasers 210, 220 generating the assist laser beam 211 and the process laser beam 221, the multiple laser beam processing method may also be performed using the same laser source to produce both the assist laser beam 211 and the process laser beam 221. For example, an assist laser beam may be generated from a laser source with one set of parameters (e.g., a shorter wavelength and/or pulse duration) and a process laser beam may be generated from the same laser source with a different set of parameters (e.g., a longer wavelength and/or pulse duration). A single laser beam generated by a laser source may also be split and modified with different beam delivery systems to produce the assist laser beam and the process laser beam with distinct characteristics.

Accordingly, laser processing systems and methods, as described herein, are capable of efficiently processing sapphire using a QCW SM laser in a wavelength range of about 1060-1070 nm with reduced cutting edge defects, reduced thermal damage, and increased speeds.

While the principles of the invention have been described herein, it is to be understood by those skilled in the art that this description is made only by way of example and not as a limitation as to the scope of the invention. Other embodiments are contemplated within the scope of the present invention in addition to the example embodiments shown and described herein. Modifications and substitutions by one of ordinary skill in the art are considered to be within the scope of the present invention, which is not to be limited except by the following claims.

What is claimed is:

1. A method for laser processing a sapphire substrate, the method comprising:
   periodically switching on a power source to pulse a continuous wave single mode (SM) fiber laser, thereby operating the SM fiber laser in a quasi-continuous wave ("QCW") mode so as to emit consecutive pulses of SM laser light at a wavelength ranging between about 1060 nm and about 1070 nm, the pulses of SM laser light each having a pulse width ranging between about 50 microseconds and about 600 microseconds;
   focusing the pulses of SM laser light at the sapphire substrate; and
   laser processing the sapphire substrate with the pulses of laser light.

2. The method of claim 1 further comprising supplying inert gas in a vicinity of the sapphire substrate.

3. The method of claim 2, wherein the inert gas is selected from the group consisting of argon and helium.

4. The method of claim 1, wherein laser processing the sapphire substrate is selected from the group consisting of cutting, scribing, and drilling.

5. The method of claim 1, wherein laser processing includes cutting with a speed between about 10 and 40 inches per minute, and wherein the sapphire substrate has a thickness between about 0.1 and about 1 mm.

6. The method of claim 1, wherein the laser is an ytterbium fiber laser.

7. The method of claim 1, wherein the laser is operated with a duty cycle ranging between about 1% and about 10%.

8. The method of claim 1 further comprising focusing assist laser light at the sapphire substrate, wherein the assist laser light modifies a property of the sapphire to form absorption centers, and wherein the pulses of laser light from the laser couple into the absorption centers to facilitate the laser processing.

9. The method of claim 8 wherein the assist laser light is generated by a green fiber laser configured to emit assist laser light at a wavelength of about 532 nm.

10. The method of claim 9 wherein the green fiber laser is configured to emit the assist laser light with a pulse duration of 1 ns.

11. The method of claim 8 wherein the assist laser light is directed at the sapphire substrate simultaneously with the pulses of laser light from the laser.

12. A laser processing system for laser processing sapphire substrates, the laser processing system comprising:
   a single mode (SM) fiber laser configured to operate in a quasi continuous wave ("QCW") mode to emit consecutive pulses of SM laser light at a wavelength between about 1060 nm and about 1070 nm;

a controller coupled to the fiber laser for periodically switching power to the fiber laser to pulse the fiber laser in the QCW mode such that each pulse has a pulse width ranging between about 50 microseconds and about 600 microseconds and with a duty cycle ranging between about 1% and about 10%;

a focus lens configured to focus the laser light on the sapphire substrate so as to process the sapphire substrate;

a laser head configured to direct the focused laser light to the sapphire substrate and including a nozzle for delivering an inert gas to the sapphire substrate with the laser light; and a gas delivery system configured to deliver the inert gas into the laser head.

13. The laser processing system of claim 12, wherein the fiber laser includes an ytterbium fiber laser.

14. The laser processing system of claim 12, wherein the inert gas is selected from the group consisting of argon and helium.

15. A multiple-beam laser processing system for processing a sapphire substrate, the multiple-beam laser processing system comprising:

an assist laser for generating an assist laser beam with a wavelength and a pulse duration such that the sapphire substrate is sufficiently absorptive of the assist laser beam to modify a property of the sapphire substrate;

a single mode (SM) quasi continuous wave (QCW) process fiber laser for generating a process laser beam with a wavelength between about 1060 nm and about 1070 nm, wherein the wavelength of the assist laser beam is less than the wavelength of the process laser beam; and a beam combiner for directing the assist laser beam and the SM process laser beam at a target location on the workpiece such that the assist laser beam modifies a property of the sapphire substrate at the target location forming absorption centers and such that the SM process laser beam is coupled into the absorption centers formed in the sapphire substrate at the target location to complete processing of the sapphire substrate at the target location.

16. The multiple-beam laser processing system of claim 15 further including a focus lens for focusing the assist laser beam and the process laser beam at the target location.

17. The multiple-beam laser processing system of claim 15 wherein the assist laser is a green fiber laser for generating a green assist laser beam with a wavelength of about 532 nm.

18. The multiple-beam laser processing system of claim 15, wherein the QCW fiber laser is a QCW single-mode ytterbium fiber laser.

19. The multiple-beam laser processing system of claim 15 further comprising an assist laser beam delivery system for controlling divergence of the assist laser beam such that the assist laser beam and the process laser beam have the same focal plane.

* * * * *